United States Patent [19]

Koleske

[11] Patent Number: 4,818,776

[45] Date of Patent: Apr. 4, 1989

[54] PHOTOCOPOLYMERIZABLE COMPOSITIONS BASED ON EPOXY AND HYDROXYL-CONTAINING ORGANIC MATERIALS HAVING PRIMARY HYDROXYL CONTENT

[75] Inventor: Joseph V. Koleske, Charleston, W. Va.

[73] Assignee: Union Carbide Corporation, Danbury, Conn.

[21] Appl. No.: 794,605

[22] Filed: Nov. 6, 1985

Related U.S. Application Data

[63] Continuation of Ser. No. 464,580, Feb. 7, 1983, abandoned.

[51] Int. Cl.$^4$ .................... C08G 59/24; C08G 59/62; C08G 59/68
[52] U.S. Cl. ....................................... 522/31; 522/170; 528/361; 528/406
[58] Field of Search .................. 522/170, 31; 528/361, 528/406

[56] References Cited

U.S. PATENT DOCUMENTS

| | | | |
|---|---|---|---|
| Re. 30,264 | 4/1980 | Schimmel | 523/414 |
| 3,169,945 | 2/1965 | Hostettler et al. | 521/138 |
| 3,896,303 | 7/1975 | Gerkin et al. | 525/418 |
| 4,058,401 | 11/1977 | Crivello | 522/146 |
| 4,086,293 | 4/1978 | Smith et al. | 525/411 |
| 4,086,294 | 4/1978 | Koleske et al. | 525/411 |
| 4,101,603 | 7/1978 | Smith et al. | 525/443 |
| 4,151,219 | 4/1979 | Brewbaker | 525/507 |
| 4,173,476 | 11/1979 | Smith et al. | 430/280 |
| 4,192,924 | 3/1980 | Crivello | 521/125 |
| 4,218,531 | 8/1980 | Carlson | 430/280 |
| 4,231,951 | 11/1980 | Smith et al. | 260/446 |
| 4,256,828 | 3/1981 | Smith | 430/280 |
| 4,261,871 | 4/1981 | Smith et al. | 525/411 |
| 4,291,155 | 9/1981 | Brochet | 528/354 |
| 4,305,861 | 12/1981 | Marx | 528/407 |
| 4,316,991 | 2/1982 | Speranza | 528/418 |
| 4,324,679 | 4/1982 | Carlson | 204/159.11 |
| 4,415,701 | 11/1983 | Bauer | 528/361 |
| 4,416,917 | 11/1983 | France et al. | 427/302 |
| 4,434,286 | 2/1984 | Burhans | 528/361 |
| 4,539,378 | 9/1985 | Cuscurida | 525/404 |

OTHER PUBLICATIONS

Copending U.S. patent application Ser. No. 369,835, filed Apr. 19, 1982 entitled "Photocopolymerizable Compositions Based on Epoxy and Hydroxyl-Containing Organic Materials", Joseph Victor Koleske.

*Primary Examiner*—John C. Bleutge
*Assistant Examiner*—Arthur H. Koeckert
*Attorney, Agent, or Firm*—Jean B. Mauro

[57] ABSTRACT

This invention is directed to photocopolymerizable compositions comprising an epoxide containing two or more epoxy groups, a poly (active hydrogen) organic compound having at least some primary hydroxyl content and a photoinitiator. The cured coating compositions exhibit fast cure rates, good water resistance and can have utility as automotive finishes, can finishes, appliance finishes, general metal finishes, printing inks, adhesives and the like.

15 Claims, No Drawings

PHOTOCOPOLYMERIZABLE COMPOSITIONS BASED ON EPOXY AND HYDROXYL-CONTAINING ORGANIC MATERIALS HAVING PRIMARY HYDROXYL CONTENT

This application is a continuation of U.S. application Ser. No. 464,580, filed Feb. 7, 1983, now abandoned.

BRIEF SUMMARY OF THE INVENTION

1. Technical Field

This invention is directed in general to coating compositions and, in particular, to photocopolymerizable compositions comprising an epoxide containing two or more epoxy groups, a poly (active hydrogen) organic compound having at least some primary hydroxyl content and a photoinitiator.

2. Background Art

In the field of radiation curable coatings, it is well known that coating compositions containing cycloaliphatic epoxides and hydroxyl-containing materials can be radiation cured by the use of onium salts such as FC-508 available from the 3M Company and UVE-1014 available from General Electric Company. The onium salts form shelf-stable formulations with cycloaliphatic epoxides and hydroxyl-containing materials in an environment free of ultraviolet light irradiation. When such onium salts are irradiated with ultraviolet light, a cationic catalyst composition is formed that cures the formulation into a coating film. Many hydroxyl-containing materials are described in the art as being useful ingredients in radiation curable coatings. The particular hydroxyl-containing material selected as an ingredient in a radiation curable, epoxy-containing coating formulation can affect the cure rate of the coating formulation and also the properties of the cured film coating.

Copending U.S. patent application Ser. No. 369,835, filed Apr. 19, 1982, now abandoned, discloses photocopolymerizable compositions comprising a cycloaliphatic epoxide, an alkylene oxide derived polyol having an average molecular weight of from about 2000 to about 4500, and a photoinitiator. These compositions are particularly suited for coating paper, wood, metal and plastic substrates.

U.S. Pat. No. 4,256,828 describes photocopolymerizable compositions which contain epoxides, organic material with hydroxyl functionality and a photosensitive aromatic sulfonium or iodonium salt of a halogen-containing complex ion. The organic material with hydroxyl functionality is described in the patent beginning at column 4, line 54 and extending through column 6, line 63. It is stated that the organic material contains two or more primary or secondary aliphatic hydroxyl groups (see column 5, lines 4–7).

U.S. Pat. No. 4,231,951 also describes photocopolymerizable compositions which contain cycloaliphatic epoxides, organic materials having hydroxyl functionality and a triarylsulfonium complex salt photoinitiator. The organic material with hydroxyl functionality is described in the patent beginning at column 3, line 67 and extending through column 5, line 47. It is stated that the organic material contains two or more primary or secondary aliphatic hydroxyl groups (see column 4, lines 18–21).

U.S. Pat. No. 4,173,476 describes photocopolymerizable compositions which contain epoxides, organic materials with hydroxyl functionality and a triarylsulfonium complex salt photoinitiator. The organic material with hydroxyl functionality is described in the patent beginning at column 3, line 62 and extending through column 5, line 42. It is stated that the organic material contains two or more primary or secondary aliphatic hydroxyl groups (see column 4, lines 13–16).

U.S. Pat. No. 4,218,531 describes the use of certain organic materials having non-aromatic carbon-carbon unsaturation in connection with photocopolymerizable compositions containing aromatic sulfonium complex salt photoinitiators in order to minimize or eliminate the odor of organosulfur reaction by-products. The photocopolymerizable compositions also contain epoxides and hydroxy-containing organic materials. The hydroxyl-containing organic materials are described in the patent beginning at column 3, line 16 and extending through column 5, line 25. It is stated that the organic material contains two or more primary or secondary aliphatic hydroxyl groups (see column 3, lines 36–39).

It has been found as a result of the present invention that photocopolymerizable coating compositions based on epoxy and hydroxyl-containing organic materials, in which the hydroxyl-containing organic materials are poly (active hydrogen) organic compounds having at least some primary hydroxyl content, e.g., propylene oxide polyols capped with ethylene oxide, exhibit significantly higher cure rates in comparison with photocopolymerizable compositions containing hydroxyl-containing materials having no primary hydroxyl content, e.g., propylene oxide polyols not capped with ethylene oxide. The cured coating films of this invention also exhibit good water resistance with no thermal post cure and other highly desirable film properties as described more fully hereinbelow.

DISCLOSURE OF THE INVENTION

The present invention is directed to photocopolymerizable compositions comprising an epoxide containing two or more epoxy groups, a poly (active hydrogen) organic compound having at least some primary hydroxyl content derived from an initiator, e.g. glycerol, and an alkylene oxide having the formula:

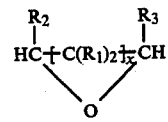

and end capped at least to a degree with an alkylene oxide having the formula:

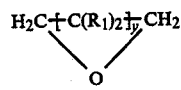

or with a caprolactone having the formula

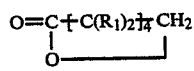

wherein $R_1$ is individually hydrogen, alkyl, alkoxy, aryl, cycloalkyl, alkaryl or aralkyl having up to 12 carbon atoms, $R_2$ is hydrogen or alkyl having from 1 to about 12 carbon atoms, $R_3$ is alkyl having from 1 to about 12 carbon atoms, x is a value of from 0 to about 5 and y is a value of from 0 to about 6, and a photoinitiator. The invention is also directed to blend formulations comprising an epoxide containing two or more epoxy groups and a poly (active hydrogen) organic compound having at least some primary hydroxyl content as described above. The above compositions can optionally contain a reactive diluent such as a substituted cycloaliphatic monoepoxide, i.e., 4-vinyl cyclohexene monoepoxide, a surfactant, fillers, additives and an organic solvent where necessary. The photocopolymerizable coating compositions of the present invention based on epoxy and hydroxyl-containing organic materials, in which the hydroxyl-containing organic materials are poly (active hydrogen) organic compounds having at least some primary hydroxyl content as described above, e.g., propylene oxide polyols capped with ethylene oxide, exhibit significantly higher cure rates than photocopolymerizable compositions containing hydroxyl-containing materials having no primary hydroxyl content, e.g., propylene oxide polyols not capped with ethylene oxide. The cured coating films of this invention also exhibit good water resistance with no thermal post cure and other highly desirable film properties as described more fully hereinbelow. The cured coating films are particularly suited for coating paper, wood, metal and plastic substrates, in particular, automotive finishes, can finishes, appliance finishes business machine finishes, coil coating, house siding, general metal finishing and the like.

The invention is further directed to a process for preparing a cured film coating comprising: (1) mixing until homogeneous a photocopolymerizable composition comprising an epoxide containing two or more epoxy groups, a poly (active hydrogen) organic compound having at least some primary hydroxyl content derived from an initiator, e.g. glycerol, and an alkylene oxide having the formula:

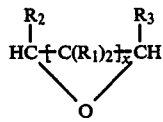

and end capped at least to a degree with an alkylene oxide having the formula:

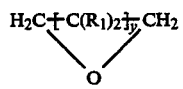

or with a caprolactone having the formula

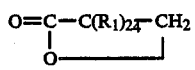

wherein $R_1$ is individually hydrogen, alkyl, alkoxy, aryl, cycloalkyl, alkaryl or aralkyl having up to 12 carbon atoms, $R_2$ is hydrogen or alkyl having from 1 to about 12 carbon atoms, $R_3$ is alkyl having from 1 to about 12 carbon atoms, x is a value of from 0 to about 5 and y is a value of from 0 to about 6, and a photoinitiator; (2) applying the homogeneous photocpolymerizable composition as a film coating on a suitable surface or substrate; and (3) exposing the film coating to actinic irradiation at a wavelength within the ultraviolet and visible spectral regions or electron beam irradiation for a period of time sufficient to cure the film coating. The cured film coating prepared by the above described process is also part of this invention.

In copending U.S. patent application Ser. No. 464,571, filed on Feb. 7, 1983, now abandoned, there is described photocopolymerizable compositions comprising an epoxide containing two or more epoxy groups, a poly(active hydrogen) organic compound, a photoinitiator, and, as a reactive diluent, a substituted cycloaliphatic monoepoxide. The photocopolymerizable compositions have desirably low viscosity and can be applied in a conventional manner such as roll coating, spray and the like and, after being cured to dry coating films, can have utility as automotive finishes, appliance finishes, general metal finishes and the like.

Copending U.S. patent application Ser. No. 464,568, filed on Feb. 7, 1983, now abandoned, describes photocopolymerizable compositions comprising a poly-(active hydrogen) organic compound, a photoinitiator and, as a reactive diluent, a substituted cycloaliphatic monoepoxide. The photocopolymerizable compositions have low viscosity and can be applied to suitable substrates by conventional methods and, after curing, provide excellent pressure sensitive and heat-activated adhesive coatings.

In copending U.S. patent application Ser. No. 464,563, filed on Feb. 7, 1983, now U.S. Pat. No. 4,593,051, there is described photocopolymerizable compositions comprising an epoxide containing two or more epoxy groups, a polymer/poly (active hydrogen) organic compound and a photoinitiator. The cured coating compositions exhibit a clear appearance, good water resistance and can have utility as automotive finishes, appliance finishes, general metal finishing and the like.

In copending U.S. patent application Ser. No. 464,564, filed on Feb. 7, 1983, now abandoned, there is described photocopolymerizable compositions comprising an epoxide containing two or more epoxy groups, a photoinitiator and, as a reactive diluent, a substituted cycloaliphatic monoepoxide. The photocopolymerizable compositions have desirably low viscosity and can be applied to a suitable substrate in a conventional manner such as roll coating, spray and the like. The cured coatings are suitable for use in a variety of applications in the fields of protective coatings and graphic arts.

Copending U.S. patent application Ser. No. 464,570, filed on Feb. 7, 1983, now abandoned, describes photocopolymerizable compositions comprising a photoinitiator selected from diazonium salts, onium salts and mixtures thereof and, as a reactive diluent, a cycloaliphatic epoxide. The photocopolymerizable compositions have desirably low viscosity and can be applied to suitable substrates by conventional methods.

Copending U.S. patent application Ser. No. 464,558, filed on Feb. 7, 1983, now U.S. Pat. No. 4,622,349 describes photocopolymerizable compositions comprising an epoxide containing two or more epoxy groups, a poly (active hydrogen) organic compound and a hydroxyl substituted cycloaliphatic monoepoxide. The photopolymerizable compositions can be cured into coatings which have improved water resistance.

DETAILED DESCRIPTION

The epoxides which may be used herein contain two or more epoxy groups having the formula:

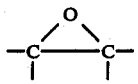

and have a viscosity of about 200, or higher, centipoise at 25° C. The epoxy groups can be terminal epoxy groups or internal epoxy groups. The epoxides are primarily cycloaliphatic epoxides. These cycloaliphatic epoxide resins may be blended with minor amounts of glycidyl type epoxies, aliphatic epoxies, epoxy resol novolac resins, epoxy phenol novolac resins, polynuclear phenol-glycidyl ether-derived resins, aromatic and heterocyclic glycidyl amine resins, hydantoin epoxy resins, and the like, and mixtures thereof. These epoxides are well known in the art and many are commercially available.

Suitable cycloaliphatic epoxide resins for purposes of this invention are those having an average of two or more epoxy groups per molecule. Illustrative of suitable cycloaliphatic epoxides are the following:

FORMULA I

Diepoxides of cycloaliphatic esters of dicarboxylic acids having the formula:

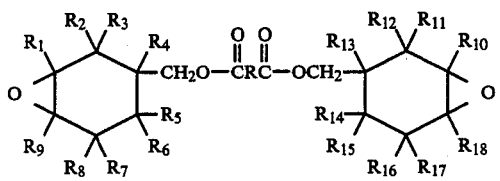

wherein $R_1$ through $R_{18}$, which can be the same or different, are hydrogen or alkyl radicals generally containing one to nine carbon atoms inclusive, and preferably containing one to three carbon atoms, inclusive, as for example methyl, ethyl, n-propyl, n-butyl, n-hexyl, 2-ethylhexyl, n-octyl, n-nonyl and the like; R is a valence bond or a divalent hydrocarbon radical generally containing one to twenty carbon atoms, inclusive, and preferably, containing four to six carbon atoms, inclusive, as for example, alkylene radicals, such as trimethylene, tetramethylene, pentamethylene, hexamethylene, 2-ethylhexamethylene, octamethylene, nonamethylene, hexadecamethylene, and the like; cycloaliphatic radicals, such as 1,4-cyclohexane, 1,3-cyclohexane, 1,2-cyclohexane, and the like.

Particularly desirable epoxides, falling within the scope of Formula I, are those wherein $R_1$ through $R_{18}$ are hydrogen and R is alkylene containing four to six carbon atoms.

Among specific diepoxides of cycloaliphatic esters of dicarboxylic acids are the following:
bis(3,4-epoxycyclohexylmethyl)oxalate,
bis(3,4-epoxycyclohexylmethyl)adipate,
bis(3,4-epoxy-6-methylcyclohexylmethyl)adipate,
bis(3,4-epoxycyclohexylmethyl)pimelate, and the like.

Other suitable compounds are described in, for example, U.S. Pat. No. 2,750,395.

FORMULA II

A 3,4-epoxycyclohexylmethyl-3,4-epoxycyclohexane carboxylate having the formula:

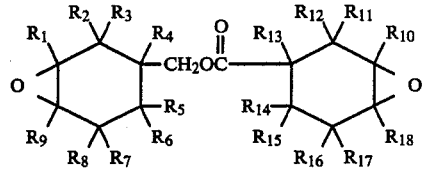

wherein $R^1$ through $R^{18}$ which can be the same or different are as defined for $R_1$ through $R_{18}$ in Formula I. Particularly desirable compounds are those wherein $R^1$ through $R^{18}$ are hydrogen.

Among specific compounds falling within the scope of Formula II are the following: 3,4-epoxycyclohexylmethyl-3,4-epoxycyclohexane carboxylate; 3,4-epoxy-1-methylcyclohexylmethyl-3,4-epoxy-1-methylcyclohexane carboxylate; 6-methyl-3,4-epoxycyclohexylmethyl-6-methyl-3,4-epoxycyclohexane carboxylate; 3,4-epoxy-3-methylcyclohexylmethyl-3,4-epoxy-3-methylcyclohexane carboxylate; 3,4-epoxy-5-methylcyclohexylmethyl-3,4-epoxy-5-methylcyclohexane carboxylate. Other suitable compounds are described in, for example, U.S. Pat. No. 2,890,194.

FORMULA III

Diepoxides having the formula:

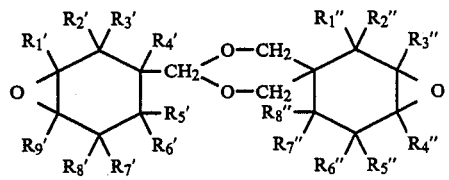

wherein the R single and double primes, which can be the same or different, are monovalent substituents such as hydrogen, halogen, i.e. chlorine, bromine, iodine or fluorine, or monovalent hydrocarbon radicals, or radicals as further defined in U.S. Pat. No. 3,318,822. Particularly, desirable compounds are those wherein all the R's are hydrogen.

Other suitable cycloaliphatic epoxides are the following:

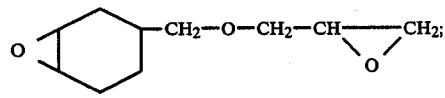

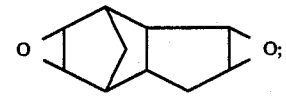

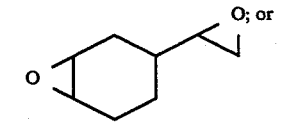

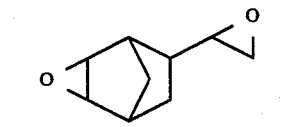

and the like.

The preferred cycloaliphatic epoxides are the following:

3,4-Epoxycyclohexylmethyl-3,4-Epoxycyclohexane carboxylate

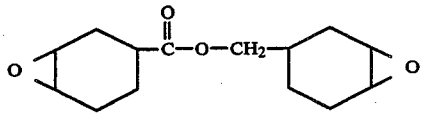

Bis(3,4-Epoxycyclohexylmethyl)adipate

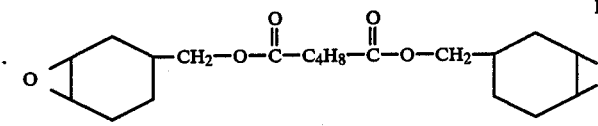

2-(3,4-Epoxycyclohexyl-5,5-spiro-3,4-epoxy)cyclohexane-meta-dioxane

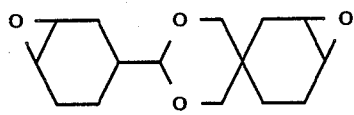

or mixtures thereof.

Epoxides with six membered ring structures may also be used, such as diglycidyl esters of phthalic acid, partially hydrogenated phthalic acid or fully hydrogenated phthalic acid, the diglycidyl esters of hexahydrophthalic acids being preferred. A representative diglycidyl ester of phthalic acid is the following:

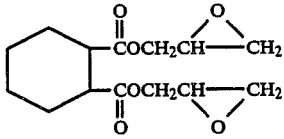

The glycidyl-type epoxides are preferably diglycidyl ethers of bisphenol A which are derived from bisphenol A and epichlorohydrin and have the following formula:

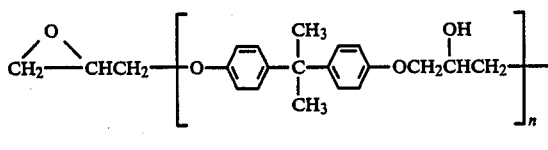

The cresol-novolac epoxy resins are multifunctional, solid polymers characterized by low ionic and hydrolyzable chlorine impurities, high chemical resistance, and thermal performance.

The epoxy phenol novolac resins are generally of the following formula:

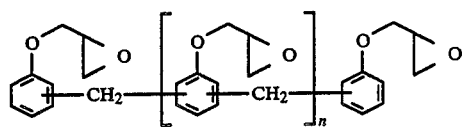

The polynuclear phenol-glycidyl ether-derived resins are generally of the formula:

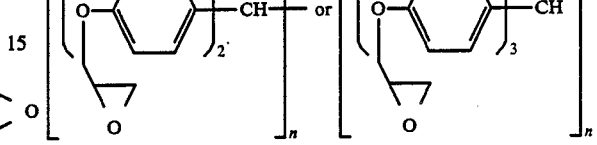

Among the aromatic and heterocyclic glycidyl amine resins which may be included herein are the following: tetraglycidylmethylenedianiline derived resins of the following formula:

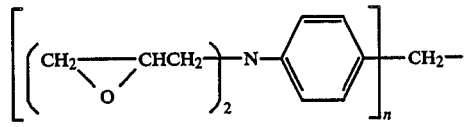

Triglycidyl-p-aminophenol derived resins, triazine based resins and hydantoin epoxy resins of the formula:

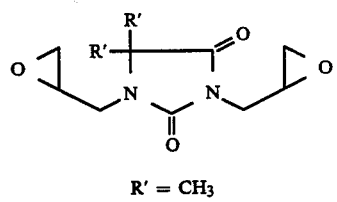

R' = CH₃

It is of course understood by those skilled in the art that when a photoinitiator is used, only minor amounts of basic organic nitrogen-containing epoxide compounds may be used so as not to interfere with the photocopolymerization reaction.

The concentration of the epoxides in the photocopolymerizable and blend compositions of this invention can range from about 1 to about 95 weight percent, preferably from 25 to 90 weight percent, and most preferably from 50 to 80 weight percent of the total weight of the coating composition depending upon the desired properties in the cured compositions. The ratio of the equivalent weight of epoxide to the total hydroxyl equivalent weight of the poly (active hydrogen) organic compound having at least some primary hydroxy content can range from about 120:1 to about 1:1, preferably from 110:1 to about 5:1, and most preferably from about 100:1 to about 10:1 depending upon the properties desired in the cured compositions. The preferred epoxides for use in the coating compositions of this invention are described in copending U.S. patent application Ser. No. 464,564, filed on an even date herewith.

The poly (active hydrogen) organic compound having at least some primary hydroxyl content that is blended with the epoxide containing two or more epoxy groups to produce the coating compositions of this invention includes any compatible organic compound containing two or more active hydrogen atoms per molecule and containing at least some primary hydroxyl content. The preferred poly (active hydrogen) organic compounds having at least some primary hydroxyl content can be derived from an initiator, e.g., glycerol, and an alkylene oxide having the formula:

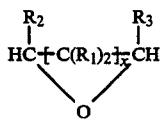

and end capped at least to a degree with an alkylene oxide having the formula:

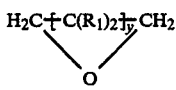

or with a caprolactone having the formula

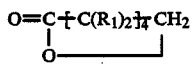

wherein R1 is individually hydrogen, alkyl, alkoxy, aryl, cycloalkyl, alkaryl or aralkyl having up to 12 carbon atoms, R2 is hydrogen or alkyl having from 1 to about 12 carbon atoms, R3 is alkyl having from 1 to about 12 carbon atoms, x is a value of from 0 to about 5 and y is a value of from 0 to about 6. The poly (active hydrogen) organic compounds are well known to those skilled in the art and include, for example, propylene oxide polyols having at least some primary hydroxyl content and the like.

Substantially any of the organic polyols having at least some primary hydroxyl content previously used in the art to make coating compositions can be used and are preferred as the poly (active hydrogen) organic compounds in this invention. Illustrative of the organic polyols having at least some primary hydroxyl content useful in producing coating compositions in accordance with this invention are the ethylene oxide capped or caprolactone capped polyhydroxyalkanes, polyoxyalkylene polyols, and the like. Among the organic polyols having primary hydroxyl content which can be employed are those selected from one or more of the following classes of compositions, alone or in admixture, known to those skilled in the art:

(a) Alkylene oxide adducts of polyhydroxyalkanes having at least some primary hydroxyl content;
(b) Alkylene oxide adducts of non-reducing sugars and sugar derivatives having at least some primary hydroxyl content;
(c) Alkylene oxide adducts of phosphorus and polyphosphorus acids having at least some primary hydroxyl content;
(d) Alkylene oxide adducts of polyphenols having at least some primary hydroxyl content; and
(e) The polyols from natural oils such as castor oil, and the like having at least some primary hydroxyl content.

Illustrative alkylene oxide adducts of polyhydroxyalkanes (initiator) include, among others, the alkylene oxide adducts of ethylene glycol, propylene glycol, 1,3-dihydroxypropane, 1,3-dihydroxybutane, 1,4-dihydroxybutane, 1,4-, 1,5-, and 1,6-dihydroxyhexane, 1,2-, 1,3-, 1,4-, 1,6-, and 1,8-dihydroxyoctane, 1,10-dihydroxydecane, glycerol, 1,2,4-trihydroxybutane, 1,2,6-trihydroxyhexane, 1,1,1-trimethylolethane, 1,1,1-trimethylolpropane, pentaerythritol, polycaprolactone, xylitol, arabitol, sorbitol, mannitol, and the like. A preferred class of alkylene oxide adducts of polyhydroxyalkanes are the propylene oxide, butylene oxide, or mixtures thereof, adducts of trihydroxyalkanes. The alkylene oxide adducts of the polyhydroxyalkanes can be capped by conventional methods with ethylene oxide or caprolactone to provide primary hydroxyl content.

A further class of organic polyols which can be employed are the alkylene oxide adducts of the non-reducing sugars (initiator), wherein the alkylene oxides have from 2 to 4 carbon atoms. Among the non-reducing sugars and sugar derivatives contemplated are sucrose, alkyl glycosides such as methyl glucoside, ethyl glucoside, and the like, glycol glycosides such as ethylene glycol glucoside, propylene glycol glucoside, glycerol glucoside, 1,2,6-hexanetriol glucoside, and the like, as well as the alkylene oxide adducts of the alkyl glycosides as set forth in U.S. Pat. No. 3,073,788. The alkylene oxide adducts of the non-reducing sugars and sugar derivatives can be capped by conventional methods with ethylene oxide or caprolactone to provide primary hydroxyl content.

The alkylene oxide adducts of phosphorus and polyphosphorus acids (initiators) are another useful class of organic polyols. Ethylene oxide, 1,2-epoxypropane, the epoxybutanes, 3-chloro-1,2-epoxypropane and the like are preferred alkylene oxides. Phosphoric acid, phosphorus acid, the polyphosphoric acids such as tripolyphosphoric acid, the polymetaphosphoric acids, and the like are desirable for use in this connection. The alkylene oxide adducts of the phosphorus and polyphosphorus acids can be capped by conventional methods with ethylene oxide or caprolactone to provide primary hydroxyl content.

A still further useful class of organic polyols is the polyphenols (initiator), and preferably the alkylene oxide adducts thereof wherein the alkylene oxides have from 2 to 4 carbon atoms. Among the polyphenols which are contemplated are, for example, bisphenol A, bisphenol F, condensation products of phenol and formaldehyde, the novolac resins, condensation products of various phenolic compounds and acrolein; the simplest member of this class being the 1,1,3-tris(hydroxyphenyl) propanes, condensation products of various phenolic compounds and glyoxal, glutaraldehyde, and other dialdehydes, the simplest members of this class being the 1,1,2,2-tetrakis(hydroxyphenol) ethanes and the like. The alkylene oxide adducts of polyphenols can be capped by conventional methods with ethylene oxide or caprolactone to provide primary hydroxyl content.

The alkylene oxide adducts of various initiators described above can include poly (oxypropylene-oxyethylene) polyols; however, desirably the oxyethylene content should comprise less than 60 percent of the total, preferably less than 50 percent of the total and most preferably less than 30 percent of the total weight of the polyol. The ethylene oxide can be incorporated in any fashion along the polymer chain. Stated another way, the ethylene oxide can be incorporated either in internal blocks, as terminal blocks, or may be randomly distributed along the polymer chain provided the poly (oxypropylene-oxyethylene) polyols have at least some primary hydroxyl content. As is well known in the art, the polyols that are most preferred herein contain varying small amounts of unsaturation. Unsaturation in itself does not affect in any adverse way the formation of the coating compositions in accordance with the present invention.

The organic polyols described hereinabove can have hydroxyl numbers which vary over a wide range. In general, the hydroxyl numbers of the above described polyols employed in this invention can range from about 15, and lower, to about 900, and higher. The hydroxyl number is defined as the number of milligrams of potassium hydroxide required for the complete neutralization of the fully phthalated derivative prepared from 1 gram of polyol. The hydroxyl number can also be defined by the equation:

$$OH = \frac{56.1 \times 1000 \times f}{m.w.}$$

where
OH = hydroxyl number of the polyol;
f = functionality, that is, average number of hydroxyl groups per molecule of polyol; and
m.w. = molecular weight of the polyol.

The organic polyols described hereinabove can be prepared by conventional methods and are commercially available from a number of manufacturers. Preferred commercial polyols having at least some primary hydroxyl content include among others a propylene oxide polyol capped with ethylene oxide available from Union Carbide Corporation as E-480, a propylene oxide polyol capped with ethylene oxide commercially available from Union Carbide Corporation as NIAX Polyol 11-34, a propylene oxide polyol capped with ethylene oxide commercially available from Union Carbide Corporation as E-474, and a propylene oxide polyol capped with ethylene oxide commercially available from Union Carbide Corporation as NIAX Polyol 11-27.

A most preferred ethylene oxide capped polyoxyalkylene derived polyol suitable for use in this invention has a molecular weight of from about 200 or lower about 10,000 or higher and has the following formula:

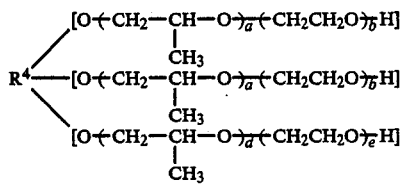

wherein R4 is alkyl having from 3 to about 12 carbon atoms, preferably 3 carbon atoms, a has a value of from 0 to about 150, b has a value of from 0 to about 40, b has a value of from 1 to about 150 and e has a value of from 1 to about 40. It is appreciated that the propylene oxide adduct is end capped at least to a degree with ethylene oxide. As is well known in the art, the organic polyols preferred herein can contain varying amounts of end capping either with an alkylene oxide having the formula described above, e.g., ethylene oxide, or with a caprolactone having the formula described above, e.g., epsilon-caprolactone. The organic polyols employed in the coating compositions of this invention contain at least some primary hydroxyl content. While epsilon-caprolactone is the preferred lactone, other lactones such as delta-valerolactone, zeta-enantholactone and the like including substituted derivatives thereof that yield primary hydroxyl groups when ring opened with an active hydrogen can also be employed in the coating compositions of this invention.

The concentration of the poly (active hydrogen) organic compound having at least some primary hydroxyl content in the photocopolymerizable and blend compositions of this invention can range from about 1 to about 60 weight percent, preferably from 5 to 40 weight percent, and most preferably from 10 to 30 weight percent of the total weight of the coating composition depending upon the properties desired in the cured compositions. The ratio of the equivalent weight of epoxide to the total hydroxyl equivalent weight of organic polyol can range from about 120:1 to about 1:1, preferably from 110:1 to about 5:1, and most preferably from about 100:1 to about 10:1 depending upon the equivalent weight of the polyol and the properties desired in the cured compositions.

The poly (active hydrogen) organic compounds having at least some primary hydroxyl content utilized in the coating compositions of this invention can be mixtures or blends of at least two different poly (active hydrogen) organic compounds having at least some primary hydroxyl content or mixtures or blends of a poly (active hydrogen) organic compound having at least some primary hydroxyl content with at least one other poly(active hydrogen) organic compound which does not necessarily have primary hydroxyl content. Suitable poly(active hydrogen) organic compounds which can be mixed or blended with the poly (active hydrogen) organic compound having at least some primary hydroxyl content include polyester and polyether polyols having at least some primary hydroxyl content as described above, polyether polyols as described above but having no primary hydroxyl content, polyester polyols, polycaprolactone polyols, acrylic and vinyl polyols, polymer/polyols and the like. It is appreciated that the suitable poly(active hydrogen) organic compounds which can be blended or mixed with the poly(active hydrogen) organic compound having at least some primary hydroxyl content should be present in minor amounts in the blend or mixture compositions so as to not negate the benefits described hereinabove of the poly (active hydrogen) organic compound having at least some primary hydroxyl content employed in the coating compositions of this invention. Other mixtures or blends may similarly be used if desired. The suitable blended or mixed poly(active hydrogen) organic compounds should be present in amounts less than 50 weight percent, preferably less than 25 weight percent, of the total poly (active hydrogen) organic compound concentration in the coating compositions.

The preferred classes of suitable poly(active hydrogen) organic compounds which can be blended or mixed with the poly(active hydrogen) organic compound having at least some primary hydroxyl content and employed in minor amounts in the coating compositions of this invention are the polycaprolactone polyols such as TONE-0200 and TONE-0305 commercially available from Union Carbide Corporation, the dihydroxy functional polytetramethylene oxide polyols such as Polymeg 650, 1000 and 2000 commercially available from Quaker Oats Company, the polymer/polyols such as NIAX Polymer Polyol 31-23 and 34-28 commercially available from Union Carbide Corporation, and of course the ethylene oxide and propylene oxide adducts including ethylene glycol, diethylene glycol, the poly (oxyethylene) glycols, the poly (oxypropylene) glycols, triols and higher functionality polyols such as LHT-67, LHT-112 and LG-56 commercially available from Union Carbide Corporation. These polyols also include poly(oxypropylene-oxyethylene) polyols; however, desirably, the oxyethylene content should comprise less than 80 percent of the total and preferably less than 60 percent. The ethylene oxide when used can be incorporated as internal blocks along the polymer chain. As is well known in the art, the polyols that are preferred herein contain varying small amounts of unsaturaion. Unsaturation in itself does not affect in any adverse way the formation of the coating compositions in accordance with the present invention.

Other preferred representative examples of suitable poly(active hydrogen) organic compounds which can be blended or mixed with the poly(active hydrogen) organic compound having at least some primary hydroxyl content and employed in minor amounts in the coating compositions of this invention include copolymers of hydroxypropyl and hydroxyethyl acrylates and methacrylates with other free radical-polymerizable monomers such as acrylate esters, vinyl halides, vinyl acetate, or styrene; copolymers containing pendent hydroxy groups formed by hydrolysis or partial hydrolysis of vinyl acetate copolymers, polyvinylacetal resins containing pendent hydroxyl groups; modified cellulose polymers such as hydroxyethylated and hydroxypropylated cellulose; hydroxy terminated polyesters and hydroxy terminated polyalkadienes. The polyester polyols are the reaction products of polyfunctional organic carboxylic acids and polyhydric alcohols and include, for example, poly(hexamethylene adipate), poly(ethylene adipate), poly(butylene adipate) and the like. Many of these organic polyols can be prepared by conventional methods and are commercially available from a number of manufacturers such as polyvinylacetal resins commercially available from Monsanto Chemical Company as Butvar B-72A, B-73, B-76, B-90 and B-98 and as Formvar 7/70, 12/85, 7/95S, 7/95E, 15/95S and 15/95E; and aliphatic polyester diol commercially available from Rohm and Haas as Paraplex U-148; saturated polyester polyols commercially available form Mobay Chemical Company as Multron R-2, R-12A, R-16, R-18, R-38, R-68 and R-74; a hydroxypropylated cellulose having an equivalent weight of approximately 100 commercially available from Hercules, Inc. as Klucel E, and a cellulose acetate butyrate ester having a hydroxyl equivalent weight of approximately 400 commercially available from Eastman Kodak as Alcohol Soluble Butyrate.

The photoinitiator suitable for use in the coating compositions of this invention may be any one of the well known photoinitiators such as described in, for example, U.S. Pat. Nos. 4,231,951; 4,256,828; 4,138,255 and 4,058,401 which patents are incorporated herein by reference. Preferred photoinitiators include triarylsulfonium complex salts as described in U.S. Pat. No. 4,231,951, aromatic sulfonium or iodonium salts of halogen-containing complex ions as described in U.S. Pat. No. 4,256,828; aromatic onium salts of Group VIa elements as described in U.S. Pat. Nos. 4,058,401 and 4,138,255; aromatic onium salts of Group Va elements as described in U.S. Pat. No. 4,069,055. Such salts are commercially available as FC-508 and FC-509 (available from Minnesota Mining and Manufacturing company), and as UVE-1014 (available from General Electric Company). Other preferred photoinitiators for use in the coating compositions of this invention are described more fully in copending U.S. patent application Ser. No. 464,570, filed on an even date herewith. The photoinitiators are used in conventional amounts such as from about 0.1 to 30 parts by weight per 100 parts by weight of the combination of epoxide and the poly(active hydrogen) organic compound having at least some primary hydroxyl content.

The photocopolymerizable coating compositions of this invention may optionally include a substituted cycloaliphatic monoepoxide as a reactive diluent therein. The use of a substituted cycloaliphatic monoepoxide as a reactive diluent in photocopolymerizable compositions based on epoxy and hydroxyl containing organic materials is more fully described in copending U.S. patent application Ser. No. 464,571, filed on an even date herewith.

The substituted cycloaliphatic monoepoxide can be substituted with alkyl of 1 to 9 carbon atoms, halogen, oxygen, ether, ester or vinyl radicals. Preferably, the substituted cycloaliphatic monoepoxide is vinyl substituted cycloaliphatic monoepoxide and is preferably selected from one or more of the following:

(1) 4-vinyl cyclohexane monoepoxide having the formula:

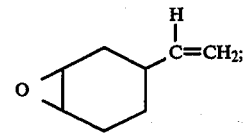

(2) norbornene monoepoxide having the formula:

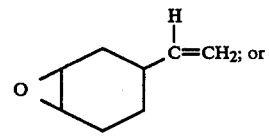

(3) limonene monoepoxide having the formula:

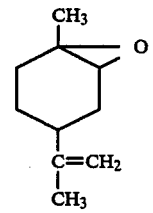

The substituted cycloaliphatic monoepoxide acts as a reactive diluent that cures into the final coating product, has a marked effect in lowering viscosity, is not volatilized during the radiation cure operation and does not retard the curing rate. The substituted cycloaliphatic monoepoxide can be used in the coating compositions in amounts of from about 0.1 to about 95, preferably from about 1 to about 60, and most preferably, from about 3 to about 30 weight percent.

The coaing compositions may preferably include additives in conventional quantities such as oils, particularly silicone oil, surfactants such as silicone alkylene oxide copolymers, e.g., L-5410 commercially available from Union Carbide corporation, silicone oil containing aliphatic expoxide groups, fluorocarbon surfactants such as FC-171 commercially available from the 3M Company and FC-430 also commercially available from the 3M Company; low molecular weight alcohols such as RJ-100 commercially available from Monsanto Chemical Company; cellosolves, such as butyl CELLOSOLVE commercially available from Union Carbide Corporation; carbitols such as butyl CARBITOL; diethyleneglycol; low molecular weight hydroxyl-containing vinyl polymers such as UCAR Solution Vinyl VYES commercially available from Union Carbide Corporation; glycidyl ether monomers of the formula:

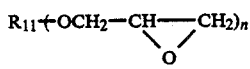

wherein $R_{11}$ is alkyl or aryl and n is an integer of 1 to 6. Examples are glycidyl ethers of polyhydric phenols obtained by reacting a polyhydric phenol with an excess of chlorohydrin such as epichlorohydrin. Further examples of this type are described in, for example, U.S. Pat. No. 3,018,262; alpha olefin expoxides; epoxy novolaks, and the like. If desired, one may also include in the coating compositions various conventional non-basic fillers (e.g., silica, talc, glass beads or bubbles, clays, powdered metal such as aluminum, zinc oxide, etc.) up to about 50% by volume or more, viscosity modifiers, rubbers, tackifying agents, pigments, and so forth. The particular additives or fillers selected are of no consequence to the basic invention.

In preparing the coating compositions, the ingredients are mixed by conventional procedures used in the production of inks, paints and coating compositions. These procedures are so well known to those skilled in the art that they do not require further discussion here. However, it should be noted that when the photoinitiator is incorporated into the coating composition, it is necessary that the curable coating formulation be mixed or blended under "safe light" such as a yellow light source to obviate or minimize photopolymerization. The coating compositions can also contain an organic solvent as an optional component. Any of the conventional solvents used in the coatings industry can be used at a concentration preferably below 30 weight percent of the total weight of the coating composition. Suitable solvents are acetone, methylene chloride and any solvent that does not react appreciably with the epoxide containing two or more epoxy groups and the photoinitiator. While larger amounts of solvent could conceivably be used, the use of larger amounts would negate the benefits of radiation curable coatings which are considered to be essentially 100% solids coating systems. The solvents are generally added in the small amounts indicated to improve flowability during application of the coating composition to the substrate.

The curable coating compositions of this invention are applied to a suitable surface or substrate by conventional means such as roll coating or spray. Curing or photopolymerization of the coating compositions occurs on exposure of the compositions to any source of radiation emitting actinic radiation at a wavelength within the ultraviolet and visible spectral regions. Suitable sources of radiation include mercury, xenon, carbon arc and tungsten filament lamps, sunlight, etc. Exposures may be from less than about 1 second to 10 minutes or more depending upon the amounts of particular polymerizable materials and photoinitiator being utilized and depending upon the radiation source and distance from the source and the thickness of the coating to be cured. The compositions may also be polymerized by exposure to electron beam irradiation. Generally speaking the dosage necessary is from less than 1 megarad to 100 megarad or more. Generally speaking the rate of polymerization increases with increasing amounts of photoinitiator at a given light exposure or irradiation. The rate of polymerization also increases with increasing light intensity or electron dosage.

The curing or photopolymerization of the coating composition is a triggered reaction. Once the degradation of the photoinitiator to a cationic catalyst has began by exposure to a radiation source, the curing or photopolymerization reaction proceeds and will continue after the radiation source is removed. The use of thermal energy during or after exposure to a radiation source, i.e., post cure thermally, will generally accelerate the curing reaction, and even a moderate increase in temperature may greatly accelerate cure rate.

The photocopolymerizable compositions of this invention can be useful as automotive finishes, can finishes, appliance finishes, business machine finishes, coil coating, house siding finishes, general metal finishes and the like. The compositions can also be used as adhesives, printing inks, casting and molding compounds, potting and encapsulating compounds, caulking and sealing compounds, impregnating and coating compounds and the like. The photocopolymerizable compositions are particularly suitable in a variety of applications in the fields of protective coatings and graphic arts due to their superior water resistance, impact resistance, abrasion-resistance and adhesion to rigid, resilient and flexible substrates such as metal, plastic, rubber, glass, paper, wood, and ceramics.

The coating compositions were evaluated according to the following procedures:

Solvent Resistance (double acetone rubs): a measure of the resistance of the cured film to attack by acetone in which a film coating surface was rubbed with an acetone soaked cheesecloth back and forth with hand pressure. A rub back and forth with hand pressure over the film coating surface with the acetone soaked cheesecloth with designated as one "double acetone rub". The effect that a certain number of double acetone rubs had on the film coating surface was reported by a number in parenthesis following the number of double acetone rubs. The rating system for evaluating acetone resistance for a given number of double acetone rubs was as follows:

Number in Parenthesis After Number of Rubs (1) No change in coating appearance
 (2) Scratched surface
(3) Dulled, marred, some coating removed
(4) Breaks in coating appearance
(5) About one-half of the coating removed.

Pencil Hardness: pencil leads of increasing hardness values were forced against the film coating surface in a precisely defined manner as described in ASTM-D-3363-74 until one pencil lead marred the surface of the film coating. The surface hardness was considered as the hardest pencil grade which just failed to mar the film coating surface. The pencil leads in order of softest to hardest were reported as follows: 6B, 5B, 4B, 3B, 2B, B, HB, F, H, 2H, 3H, 4H, 5H, 6H, 7H, 8H, and 9H.

Crosshatch Adhesion: a lattice pattern with ten cuts in each direction was made in the coating film to the substrate and pressure-sensitive adhesive tape was applied over the lattice pattern and then removed. The adhesion was evaluated by comparison with descriptions and illustrations as more fully detailed in ASTM D3359-78.

Forward Impact Resistance (Gardner Impact): a measure of the ability of a cured film coating to resist rupture from a falling weight. A Gardner Impact Tester Model IG-1120 using an eight pound dart was used to test film coatings cast and cured on steel panels. The dart was raised to a given height in inches and dropped onto the coated side of the coated steel panel. The inches times pounds, designated inch-pounds, absorbed by the film without rupturing was recorded as the films forward impact resistance.

Reverse Impact Resistance (Gardner Impact): a measure of the ability of a cured film coating to resist rupture from a falling weight. A Gardner Impact Tester Model IG-1120 using an eight pound dart was used to test film coatings cast and cured on steel panels. The dart was raised to a given height in inches and dropped onto the uncoated side of the coated steel panel. The inches times pounds, designated inch-pounds, absorbed by the film without rupturing was recorded as the films reverse impact resistance.

Moisture Resistance: The cured film coating was immersed in water for a specified period of time and at a specified temperature. After removal from the water, the hydrolytic resistance of the cured film coating was determined by the pencil hardness test and the crosshatch adhesion test described hereinabove. Results obtained were compared with the results of identical tests performed on cured film coatings not immersed in water to determine moisture resistance.

The following examples are illustrative of the present invention and are not intended as a limitation upon the scope thereof. As used in the examples appearing hereinafter, the following designations, terms and abbreviations have the indicated meanings:

| | |
|---|---|
| cps | centipoise |
| in./lbs. | inch/pounds |
| °C. | Centigrade degree |
| °F. | Fahrenheit degree |
| Hr. | hour |
| % | percent by weight unless otherwise specified |
| Numbered Examples | examples which illustrate this invention |
| Lettered Examples | comparative examples which do not illustrate this invention |
| Epoxy/OH Eq. Wt. Ratio | The ratio of the equivalent weight of epoxide to the total hydroxyl equivalent weight of polyol. |
| Epoxide I | 3,4-Epoxycyclohexyl-methyl-3-4-epoxycyclohexane carboxylate commercially available from Union Carbide Corporation as ERL-4221. |
| Polyol I | A propylene oxide polyol not capped with ethylene oxide having an average equivalent weight of 1385, an average hydroxyl number of 40.5 and commercially available from Union Carbide Corporation as LHT-42. |
| Polyol II | A propylene oxide polyol capped with ethylene oxide having an average equivalent weight of 1439, and average hydroxyl number of 39 and available from Union Carbide Corporation as E-480. |
| Polyol III | A propylene oxide polyol capped with ethylene oxide having an average equivalent weight of 1603, an average hydroxyl number of 35 and commercially available from Union Carbide Corporation as Niax Polyol 11-34. |
| Polyol IV | A propylene oxide polyol not capped with ethylene oxide having an average equivalent weight 1996, an average hydroxyl number of 28.1 and commercially available from Union Carbide Corporation as LHT-28. |
| Polyol V | A propylene oxide polyol capped with ethylene oxide having an average equivalent weight of 2078, an average hydroxyl number of 27 and commercially available from Union Carbide Corporation as E-474. |
| Polyol VI | A propylene oxide polyol capped with ethylene oxide having an average equivalent weight of 2078, an average hydroxyl number of 27 and commercially available from Union Carbide Corporation as NIAX Polyol 11-27. |
| Reactive Diluent I | 4-Vinyl cyclohexene monoepoxide |
| Photoinitiator I | A solution of a triarylsulfonium hexafluorophosphate having a specific gravity of 1.33 at 23° C., a Brookfield viscosity of 40,000–60,000 centipoise (#4 spindle at 6 rpm, 23° C.) and commercially available from the 3M Company as FC-508. |
| Photoinitiator II | A solution of a triarylsulfonium hexafluoro-antimony salt having a specific gravity of 1.39, a Brookfield viscosity of 74 centipoise at 25° C. and commercially available from General Electric Company as UVE-1014. |
| Surfactant I | A silicone composition having the following structure |

$$(CH_2)_3 SiO-\left[\begin{array}{c}CH_3 \\ | \\ SiO \\ | \\ CH_3\end{array}\right]_{13}-\left[\begin{array}{c}CH_3 \\ | \\ SiO \\ | \\ (CH_2)_3(OC_2H_4)_7OH\end{array}\right]_{5.5}-Si(CH_3)_3$$

and commercially available from Union Carbide Corporation as L-5410.

EXAMPLES 1 THROUGH 4 AND COMPARATIVE EXAMPLES A THROUGH D

Into brown glass bottles under a yellow light source was added Epoxide I, Polyol I, Polyol II, Polyol IV, Polyol V, Photoinitiator I and Surfactant I in the amounts specified for each example and comparative example in Table I below. The contents in the bottles were thoroughly blended until homogenous by simple stirring at ambient temperature. The mole percent of monol, diol, and triol and the percent of ethylene oxide capping for Polyol I, Polyol II, Polyol IV and Polyol V are also given in Table I.

TABLE I

| Example | A | B | 1 | 2 |
|---|---|---|---|---|
| Ingredients, grams | | | | |
| Epoxide I | 73.95 | 71.43 | 73.9 | 70.7 |
| Polyol I | 0 | 24.07 | 0 | 0 |
| Polyol II | 0 | 0 | 0 | 24.8 |
| Polyol IV | 21.55 | 0 | 0 | 0 |
| Polyol V | 0 | 0 | 21.6 | 0 |
| Photoinitiator I | 4.0 | 4.0 | 4.0 | 4.0 |
| Surfactant I | 0.5 | 0.5 | 0.5 | 0.5 |
| Polyol Properties | | | | |
| Polyol Identification | IV | I | V | II |
| Mole percent | | | | |
| Monol | 40.34 | 27.1 | 18.15 | 12.8 |
| Diol | 24.23 | 20.5 | 13.48 | 7.5 |
| Triol | 35.43 | 52.3 | 68.40 | 79.6 |
| % Ethylene Oxide Capping | 0 | 0 | 15 | 17 |

The blended formulations were then applied to Bonderite 37 ® treated steel panels using a Number 20 wire-wound rod and cured with one pass under a 100 watt per inch, medium pressure, mercury lamp ultraviolet light source at 30 feet per minute. One Bonderite 37 ® treated steel panel coated with the specified blended formulation was prepared for each example and comparative example. The cured coating in the Bonderite 37 ® treated steel panels of Examples 3 and 4 was prepared from the blended formulation of Examples 1 and 2 respectively. The cured coating on the Bonderite 37 ® treated steel panels of Comparative Examples C and D was prepared from the blended formulation of Comparative Examples A and B respectively. The thickness of the coatings varied from about 0.8 mils to about 0.9 mils. The cured coatings were tack free when warm immediately after ultraviolet light irradiation. The cured coatings designated in Table II below were not post cured thermally but were allowed to stand 24 hours at ambient temperature before testing for the properties designated in Table II. The results of the testing are given in Table II.

TABLE II

| Example | C | D | 3 | 4 |
|---|---|---|---|---|
| Properties | | | | |
| Double Acetone Rubs | 30(4) | 20(4) | 100(3) | 85(4) |
| Pencil Hardness | 4B | 2B | F | H |
| % Crosshatch Adhesion | 100 | 100 | 100 | 100 |
| Gardner Impact, in/lbs. | | | | |
| Forward | 15 | >320 | >320 | >320 |

TABLE II-continued

| Example | C | D | 3 | 4 |
|---|---|---|---|---|
| Reverse | <5 | >320 | >320 | 300 |
| Moisture Resistance | | | | |
| 24 Hr. Water Immersion at Room Temperature | | | | |
| Pencil Hardness | * | <5B | B | F |
| % Crosshatch Adhesion | * | 0 | 100 | 20 |
| 3 Hr. Water Immersion at 130° F. | | | | |
| Pencil Hardness | * | <5B | B | 2B |
| Crosshatch Adhesion | * | 0 | 100 | 15 |

*Cured coating quality too poor to test.

Table II shows that cured coatings employing propylene oxide polyols capped with ethylene oxide, e.g., Polyol II and Polyol V, have significantly higher cure speeds (rate of cure) and improved properties over cured coatings employing propylene oxide polyols not capped with ethylene oxide as disclosed in copending U.S. patent application Ser. No. 369,835, filed Apr. 19, 1982, e.g., Polyol I and Polyol IV. The solvent resistance (double acetone rubs) is indicative of the enhanced cure rate in that the larger the number of rubs, the higher the degree of polymerization (cure) attained by the coating system. Another advantage of the cured coating compositions of this invention over the cured coatings of the above copending application is the achievement of water resistance without employing a thermal post cure after ultraviolet irradiation of the coating, e.g., see Example 3 and Comparative Example C. The hardness of the cured coatings of Examples 3 and 4 is also markedly higher than the hardness of the cured coatings of Comparative Examples C and D. It is believed that the primary hydroxyl end groups of the ethylene oxide capped propylene oxide polyols are responsible for the enhanced reaction rate observed in coating systems employing said polyols as compared with coating systems employing conventional propylene oxide polyols having secondary hydroxyl groups.

EXAMPLES 5 THROUGH 76

Into brown glass bottles under a yellow light source was added Epoxide I, Polyol III, Polyol V, Polyol VI, Reactive Diluent I, Photoinitiator I and Surfactant I in the amounts specified for each example in Table III below. The contents in the bottles were thoroughly blended until homogeneous by simple stirring at ambient temperature. The viscosity of the resulting blends prepared in each example was then determined with a Brookfield viscometer at 31° C. for Examples 5 through 10 and Examples 23 and 24, at 23.9° for Examples 11 through 16 and Examples 25 and 26, and at 28.9° C. for Examples 17 through 22 and Examples 27 and 28. The viscosity results are given in Table III.

TABLE III

| Example | 5 | 6 | 7 | 8 | 9 | 10 | 11 | 12 | 13 | 14 | 15 | 16 |
|---|---|---|---|---|---|---|---|---|---|---|---|---|
| Ingredients, grams | | | | | | | | | | | | |
| Epoxide I | 79.7 | 73.6 | 69.6 | 63.8 | 73.6 | 63.8 | 77.6 | 74.1 | 69.0 | 60.6 | 74.1 | 60.6 |
| Polyol III | 0 | 0 | 0 | 0 | 0 | 0 | 17.9 | 21.4 | 26.5 | 34.9 | 21.4 | 34.9 |
| Polyol V | 0 | 0 | 0 | 0 | 0 | 0 | 0 | 0 | 0 | 0 | 0 | 0 |
| Polyol VI | 15.8 | 21.9 | 25.9 | 31.6 | 21.9 | 31.6 | 0 | 0 | 0 | 0 | 0 | 0 |
| Reactant Diluent I | 0 | 0 | 0 | 0 | 0 | 0 | 0 | 0 | 0 | 0 | 0 | 0 |
| Photoinitiator I | 4.0 | 4.0 | 4.0 | 4.0 | 0 | 0 | 4.0 | 4.0 | 4.0 | 4.0 | 0 | 0 |
| Photoinitiator II | 0 | 0 | 0 | 0 | 4.0 | 4.0 | 0 | 0 | 0 | 0 | 4.0 | 4.0 |
| Surfactant I | 0.5 | 0.5 | 0.5 | 0.5 | 0.5 | 0.5 | 0.5 | 0.5 | 0.5 | 0.5 | 0.5 | 0.5 |
| Properties | | | | | | | | | | | | |
| Epoxy/OH Eq. Wt. Ratio | 75 | 50 | 40 | 30 | 50 | 30 | 50 | 40 | 30 | 20 | 40 | 20 |

TABLE III-continued

| Viscosity, centipoise | 590 | 662 | 704 | 762 | 600 | 692 | 714 | 740 | 762 | 826 | 630 | 756 |
| --- | --- | --- | --- | --- | --- | --- | --- | --- | --- | --- | --- | --- |
| Example | 17 | 18 | 19 | 20 | 21 | 22 | 23 | 24 | 25 | 26 | 27 | 28 |
| Ingredients, grams | | | | | | | | | | | | |
| Epoxide I | 79.9 | 73.9 | 69.9 | 64.2 | 73.9 | 64.2 | 71.3 | 62.3 | 69.5 | 61.8 | 71.5 | 62.6 |
| Polyol III | 0 | 0 | 0 | 0 | 0 | 0 | 0 | 0 | 16.0 | 23.7 | 0 | 0 |
| Polyol V | 15.6 | 21.6 | 25.6 | 31.3 | 21.6 | 31.3 | 0 | 0 | 0 | 0 | 14.0 | 22.9 |
| Polyol VI | 0 | 0 | 0 | 0 | 0 | 0 | 14.2 | 23.2 | 0 | 0 | 0 | 0 |
| Reactive Diluent I | 0 | 0 | 0 | 0 | 0 | 0 | 10.0 | 10.0 | 10.0 | 10.0 | 10.0 | 10.0 |
| Photoinitiator I | 4.0 | 4.0 | 4.0 | 4.0 | 0 | 0 | 0 | 0 | 0 | 0 | 0 | 0 |
| Photoinitiator II | 0 | 0 | 0 | 0 | 4.0 | 4.0 | 4.0 | 4.0 | 4.0 | 4.0 | 4.0 | 4.0 |
| Surfactant I | 0.5 | 0.5 | 0.5 | 0.5 | 0.5 | 0.5 | 0.5 | 0.5 | 0.5 | 0.5 | 0.5 | 0.5 |
| Properties | | | | | | | | | | | | |
| Epoxy/OH Eq. Wt. Ratio | 75 | 50 | 40 | 30 | 50 | 30 | 86 | 47 | 58 | 35 | 86 | 47 |
| Viscosity, centipoise | 554 | 616 | 669 | 732 | 562 | 671 | 194 | 242 | 218 | 254 | 182 | 226 |

Table III shows that the viscosity of the blend formulations containing Reactive Diluent I, i.e., Examples 23 through 28, is significantly lower than the viscosity of Examples 5 through 22 which do not contain Reactive Diluent I. The coating compositions of this invention may optionally contain Reactive Diluent I as an ingredient. The use of Reactive Diluent I in photocopymerizable compositions based on epoxy and hydroxyl-containing organic materials is more fully described in copending U.S. patent application Ser. No. 464,571, filed on an Feb. 7, 1983, now abandoned.

The blended formulations were then applied to Bonderite 37 ® treated steel panels using a Number 20 wire-wound rod and cured with one pass under a 100 watt per inch, medium pressure, mercury lamp ultraviolet light source at 30 feet per minute. One Bonderite 37 ® treated steel panel coated with the specified blended formulation was prepared for each example. The cured coating on the Bonderite 37 ® treated steel panels of Examples 29 and 34 and Examples 65 and 66 was prepared from the blended formulation of Example 5 through 10 and Examples 23 and 24 respectively. The cured coating on the Bonderite 37 ® treated steel panels of Examples 35 through 40 and Examples 67 and 68 was prepared from the blended formulation of Examples 5 through 10 and Examples 23 and 24 respectively.

The cured coating on the Bonderite 37 ® treated steel panels of Examples 41 through 46 and Examples 69 and 70 was prepared from the blended formulation of Examples 11 through 16 and Examples 25 and 26 respectively. The cured coating on the Bonderite 37 ® treated steel panels of Examples 47 through 52 and Examples 71 and 72 was prepared from the blended formulation of Examples 11 through 16 and Examples 25 and 26 respectively. The cured coating on the Bonderite 37 ® treated steel panels of Example 53 through 58 and Examples 73 and 74 was prepared from the blended formulations of Examples 17 through 22 and Examples 27 and 28 respectively. The cured coating on the Bonderite 37 ® treated steel panels of Examples 59 through 64 and Example 75 and 76 was prepared from the blended formulation of Examples 17 through 22 and Examples 27 and 28 respectively. The thickness of the coatings varied from about 0.8 mils to about 0.9 mils. The cured coatings were tack free immediately after ultraviolet light irradiation. Specifically designated cured coatings in Table IV below were not post cured thermally and other specifically designated cured coatings in Table IV were post cured thermally at 170° C. for 10 minutes before testing for the properties designated in Table IV. The results of the testing are given in Table IV.

TABLE IV

| Example | 29 | 30 | 31 | 32 | 33 | 34 | 35 | 36 | 37 | 38 | 39 | 40 | 41 |
| --- | --- | --- | --- | --- | --- | --- | --- | --- | --- | --- | --- | --- | --- |
| Properties | | | | | | | | | | | | | |
| Double Acetone Rubs | 25 (4) | 25 (4) | 18 (4) | 18 (4) | 100 (1) | 50 (4) | 65 (4) | 45 (4) | 90 (4) | 90 (4) | 100 (1) | 100 (1) | 100 (1) |
| Pencil Hardness | F | F | F | F | H | H | H | F | F | F | 2H | H | HB |
| % Crosshatch Adesion | 100 | 100 | 100 | 100 | 100 | 100 | 100 | 100 | 100 | 100 | 100 | 100 | 100 |
| Thermal Post Cure | No | No | No | No | No | No | yes | yes | yes | yes | yes | yes | no |
| Gardner Impact, in/lbs. | | | | | | | | | | | | | |
| Forward | 100 | >320 | >320 | >320 | >320 | >320 | >320 | >320 | >320 | >320 | >320 | >320 | 200 |
| Reverse | 175 | >320 | >320 | >320 | >320 | >320 | >320 | >320 | >320 | >320 | >320 | >320 | 75 |
| Moisture Resistance 24 Hr. Water Immersion at Room Temperature | | | | | | | | | | | | | |
| Pencil Hardness | 2B | HB | HB | 2B | <5B | <5B | B | HB | HB | HB | HB | HB | HB |
| % Crosshatch Adhesion | 100 | 100 | 100 | 60 | 0 | 75 | 100 | 100 | 100 | 80 | 100 | 100 | 100 |
| 3 Hr. Water Immersion at 130° F. | | | | | | | | | | | | | |
| Pencil Hardness | 2B | B | B | 2B | <5B | <5B | HB | HB | HB | 2B | HB | F | 2B |
| % Crosshatch Adhesion | 95 | 100 | 100 | 95 | 0 | 0 | 100 | 100 | 100 | 100 | 100 | 100 | 100 |
| Example | 42 | 43 | 44 | 45 | 46 | 47 | 48 | 49 | 50 | 51 | 52 | 53 | 54 |
| Properties | | | | | | | | | | | | | |
| Double Acetone Rubs | 73 (4) | 43 (4) | 50 (4) | 100 (1) | 100 (1) | 100 (1) | 100 (1) | 100 (1) | 100 (1) | 100 (1) | 100 (1) | 100 (1) | 70 (4) |
| Pencil Hardness | HB | HB | 2B | HB | 2B | F | F | B | 2B | F | B | H | F |
| % Crosshatch Adhesion | 100 | 100 | 100 | 100 | 100 | 100 | 100 | 100 | 100 | 100 | 100 | 100 | 100 |

TABLE IV-continued

| | | | | | | | | | | | | | |
|---|---|---|---|---|---|---|---|---|---|---|---|---|---|
| Thermal Post Cure | no | no | no | no | no | yes | yes | yes | yes | yes | yes | no | no |
| Gardner Impact, in/lbs. | >320 | >320 | >320 | 300 | >320 | >320 | >320 | >320 | >320 | >320 | >320 | >320 | >320 |
| Forward | | | | | | | | | | | | | |
| Reverse | >320 | >320 | >320 | 275 | >320 | >320 | >320 | >320 | >320 | >320 | >320 | >320 | >320 |
| Moisture Resistance | | | | | | | | | | | | | |
| 24 Hr. Water Immersion at Room Temperature | | | | | | | | | | | | | |
| Pencil Hardness | HB | HB | 3B | <5B | <5B | HB | HB | B | 3B | F | B | 2B | F |
| % Crosshatch Adhesion | 100 | 100 | 100 | 0 | 0 | 100 | 100 | 100 | 100 | 100 | 100 | 80 | 100 |
| 3 Hr. Water Immersion at 130° F. | | | | | | | | | | | | | |
| Pencil Hardness | 3B | 5B | 3B | <5B | <5B | F | HB | HB | HB | F | F | 3B | 3B |
| % Crosshatch Adhesion | 100 | 90 | 0 | 0 | 100 | 100 | 100 | 100 | 100 | 100 | 100 | 100 | |
| 100 | | | | | | | | | | | | | |

| Example | 55 | 56 | 57 | 58 | 59 | 60 | 61 | 62 | 63 | 64 | 65 | 66 | 67 |
|---|---|---|---|---|---|---|---|---|---|---|---|---|---|
| Properties | | | | | | | | | | | | | |
| Double Acetone Rubs | 52 | 47 | 90 | 50 | 100 | 100 | 100 | 100 | 100 | 100 | 100 | 70 | 100 |
| | (4) | (4) | (4) | (4) | (1) | (1) | (1) | (1) | (1) | (1) | (1) | (4) | (1) |
| Pencil Hardness | F | F | H | F | F | F | F | HB | F | HB | H | F | H |
| % Crosshatch Adhesion | 100 | 100 | 100 | 100 | 100 | 100 | 100 | 100 | 100 | 100 | 98 | 100 | 100 |
| Thermal Post Cure | no | no | no | no | yes | yes | yes | yes | yes | yes | no | no | yes |
| Gardner Impact, in/lbs. | | | | | | | | | | | | | |
| Forward | >320 | >320 | 275 | >320 | >320 | >320 | >320 | >320 | 200 | >320 | 75 | >320 | 150 |
| Reverse | >320 | >320 | 250 | >320 | >320 | >320 | >320 | >320 | 150 | >320 | 50 | 300 | 125 |
| Moisture Resistance | | | | | | | | | | | | | |
| 24 Hr. Water Immersion at Room Temperature | | | | | | | | | | | | | |
| Pencil Hardness | B | B | B | 4B | 2B | F | B | HB | HB | HB | <5B | <5B | HB |
| % Crosshatch Adhesion | 100 | 100 | 50 | 0 | 100 | 100 | 100 | 100 | 100 | 100 | 0 | 0 | 100 |
| 3 Hr. Water Immersion at 130° F. | | | | | | | | | | | | | |
| Pencil Hardness | B | HB | <5B | <5B | F | F | HB | HB | F | F | <5B | <5B | F |
| % Crosshatch Adhesion | 100 | 90 | 0 | 0 | 100 | 100 | 100 | 100 | 100 | 100 | 0 | 0 | 100 |

| Example | 68 | 69 | 70 | 71 | 72 | 73 | 74 | 75 | 76 |
|---|---|---|---|---|---|---|---|---|---|
| Properties | | | | | | | | | |
| Double Acetone Rubs | 100 | 100 | 100 | 100 | 100 | 100 | 80 | 100 | 100 |
| | (1) | (1) | (1) | (1) | (1) | (1) | (4) | (1) | (1) |
| Pencil Hardness | H | H | F | F | F | H | F | H | F |
| % Crosshatch Adhesion | 100 | 100 | 100 | 100 | 100 | 100 | 100 | 100 | 100 |
| Thermal Post Cure | yes | no | no | yes | yes | no | no | yes | yes |
| Gardner Impact, in/lbs. | | | | | | | | | |
| Forward | >320 | 125 | >320 | 225 | >320 | 125 | >320 | 175 | >320 |
| Reverse | >320 | 100 | >320 | 200 | >320 | 100 | >320 | 125 | >320 |
| Moisture Resistance | | | | | | | | | |
| 24 Hr. Water Immersion at Room Temperature | | | | | | | | | |
| Pencil hardness | HB | <5B | <5B | F | F | 4B | 4B | HB | HB |
| % Crosshatch Adhesion | 100 | 0 | 0 | 100 | 100 | 0 | 0 | 100 | 100 |
| 3 Hr. Water Immersion at 130° F. | | | | | | | | | |
| Pencil Hardness | F | 5B | <5B | F | F | 4B | <5B | H | HB |
| % Crosshatch Adhesion | 100 | 0 | 0 | 100 | 100 | 0 | 0 | 100 | 100 |

Table IV shows the properties of cured coatings which were prepared from blend formulations containing propylene oxide polyols capped with ethylene oxide, i.e., Polyol III, Polyol V and Polyol VI.

I claim:

1. A photocopolymerizable composition having an improved cure rate and when cured resistivity to water comprising a cycloaliphatic epoxide having at least two epoxy groups, a propylene oxide polyol capped with ethylene oxide, which reacts with said epoxide, and a photoinitiator, said capped propylene oxide polyol having an average equivalent weight of about 1439 to about 2078 and an average hydroxyl number of about 27 to about 35.

2. A photocopolymerizable composition as defined in claim 1 wherein the cycloaliphatic epoxide has the formula:

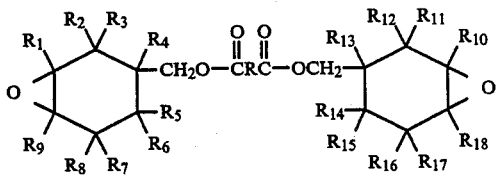

wherein $R_1$ through $R_{18}$, which can be the same or different, are hydrogen or alkyl radicals generally containing one to nine carbon atoms inclusive; R is a valence bond or a divalent hydrocarbon radical generally containing one to twenty carbon atoms inclusive.

3. A photocopolymerizable composition as defined in claim 1 wherein the cycloaliphatic epoxide has the formula:

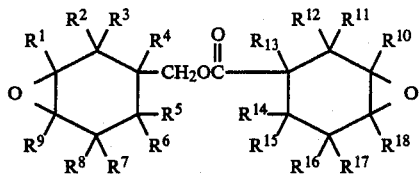

wherein $R^1$ through $R^{18}$, which can be the same or different, are hydrogen or alkyl radicals generally containing one to nine carbon atoms inclusive.

4. A photocopolymerizable composition as defined in claim 1 wherein the cycloaliphatic epoxide has the formula:

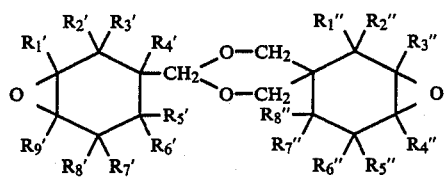

wherein the R prime and double prime groups are the same or different and are monovalent substituents or monovalent hydrocarbon radicals.

5. A photocopolymerizable composition as defined in claim 1 wherein the cycloaliphatic epoxide is 3,4-epoxycyclohexylmethyl-3,4-epoxycyclohexane carboxylate.

6. A photocopolymerizable composition as defined in claim 1 wherein the cycloaliphatic epoxide is bis(3,4-epoxycyclo-hexylmethyl)adipate.

7. A photocopolymerizable composition as defined in claim 1 wheren the cycloaliphatic epoxide is 2-(3,4-epoxycyclohexyl-5,5-spiro-3,4-epoxy)cyclohexane-meta-dioxane.

8. A photocopolymerizable composition as defined in claim 1 wherein the cycloaliphatic epoxide is a mixture of bis(3,4-epoxycyclohexylmethyl)adipate and 2-(3,4-epoxycyclohexyl-5,5-spiro-3,4-epoxy)-cyclohexane-meta-dioxane.

9. A photocopolymerizable composition as defined in claim 1 wherein the cycloaliphatic epoxide is a mixture of 3,4-epoxycyclohexylmethyl-3,4-epoxy-cyclohexane carboxylate and bis(3,4-epoxycyclohexylmethyl)adipate.

10. A photocopolymerizable composition as defined in claim 9 which includes 2-(3,4-epoxycyclohexyl)-5,5-spiro-3,4-epoxy)cyclohexane-meta-dioxane.

11. A photocopolymerizable composition as defined in claim 1 wherein the cycloaliphatic epoxide is a mixture of at least two cycloaliphatic epoxides.

12. A photocopolymerizable composition as defined in claim 1 wherein the said polyol is derived from propylene oxide and a trio.

13. A photocopolymerizable composition as defined in claim 1 wherein the triol is glycerol.

14. A photocopolymerizable composition as defined in claim 1 wherein the photoinitiator is selected from the group consisting of triarylsulfonium complex salts, aromatic sulfonium or iodonium salts of halogen-containing complex ions, aromatic onium salts of Group Va or VIa elements, and mixtures thereof.

15. The cured product of the composition defined in claim 1.

* * * * *

UNITED STATES PATENT AND TRADEMARK OFFICE
CERTIFICATE OF CORRECTION

PATENT NO. : 4,818,776
DATED : April 4, 1989
INVENTOR(S) : Joseph V. Koleske

It is certified that error appears in the above-identified patent and that said Letters Patent is hereby corrected as shown below:

Column 18, line 22, that portion reading "2078" should read -- 2004 --.

Column 18, line 23, that portion reading "27" should read -- 28 --.

Column 18, line 54, that portion reading "$(CH_2\hspace{-2pt})$" should read -- $(CH_3\hspace{-2pt})$ --

Column 26, line 23, Claim 12, line 3, that portion reading "trio" should read -- triol --.

Column 26, line 25, Claim 13, line 2, that portion reading "claim 1" should read -- claim 12 --.

Signed and Sealed this

Seventh Day of August, 1990

Attest:

HARRY F. MANBECK, JR.

*Attesting Officer*      *Commissioner of Patents and Trademarks*